Patented Apr. 13, 1948

2,439,749

UNITED STATES PATENT OFFICE 2,439,749

N-ALKYL THIAMORPHOLINES AND DERIVATIVES

Joseph B. Niederl, Brooklyn, N. Y., and William F. Hart, Easton, Pa.

No Drawing. Application May 3, 1945, Serial No. 591,850

4 Claims. (Cl. 260—243)

This invention relates to the utilization of a war gas, di-(β-chloro-ethyl) sulfide ("mustard gas"), and its oxidation products in the manufacture of useful products, such products finding application as anti-oxidants, as detergents, wetting and flotation agents, as well as bactericides, fungicides and antiseptics.

More particularly, this invention relates to the preparation from mustard gas of N-alkyl thimorpholines in which the alkyl radical contains from 12 to 18 carbon atoms, and of N-alkyl-thiamorpholine oxides and dioxides in which the alkyl radical contains the same number of carbon atoms, and which are prepared from the oxidation products of mustard gas, di-(β-chloro-ethyl) sulfoxide and di-(β-chloro-ethyl) sulfone.

This invention also relates to the derivatives of such long chain substituted thiamorpholines, thiamorpholine-oxides and thiamorpholine-dioxides in which the nitrogen atom may not only be trivalent but also penta-valent, such compounds having proven to be surface active agents. The various types of compounds involved in this invention may be expressed by the following general formula:

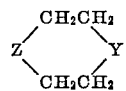

In the above general formula Z represents sulfur, or a sulfoxide, or a sulfone group, while Y represents:

NR, NR.HX, or NR(R')X

N being nitrogen, R a long chain alkyl radical of from 12 to 18 carbon atoms, R' a short chain alkyl or aralkyl radical, and X an anion.

In preparing the compounds enumerated above, mustard gas, or its oxidation products [di-(β-chloro-ethyl) sulfoxide or sulfone], is reacted with long chain primary amines (dodecyl-, tridecyl-, tetra-decyl-, penta-decyl-, hexa-decyl-, hepta-decyl-, or octa-decylamine) to yield the respective long chain substituted N-alkyl thiamorpholine, N-alkyl thiamorpholine-oxide and N-alkyl thiamorpholine-dioxide in accordance with the following equations:

N-alkyl-thiamorpholines:

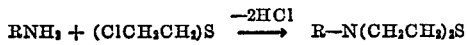

N-alkyl-thiamorpholine-1-oxides:

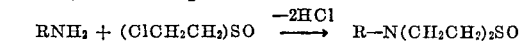

N-alkyl-thiamorpholine-1-dioxides:

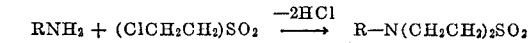

The tertiary amine salts [Z(CH₂CH₂)₂NR.HX] of the foregoing compounds are prepared by treating the free bases with mineral or with organic acids, while the quaternary ammonium salts [Z(CH₂CH₂)₂NR(R')X] are prepared by the interaction of the same free bases with alkyl mono halides, alkyl di-halides, or with esters, such as alkyl sulfates or alkyl phosphates.

*Example 1.—N-cetyl thiamorpholine*

Seventy-six grams of cetyl amine (B. P. 325° uncor.) are dissolved in 120 ml. of absolute alcohol and 34 g. of anhydrous sodium carbonate added. Fifty grams of mustard gas are then added, and the solution refluxed for eight hours. The warm solution is filtered to remove inorganic salts, which are washed twice with hot absolute alcohol. The combined alcohol extracts are distilled in vacuo to remove the solvent. The residue is then taken up in an excess of dry ether, and saturated with dry hydrogen chloride. The hydrochloride is filtered off and washed repeatedly with dry ether and with acetone. The free base is obtained by taking up the hydrochloride in a concentrated potassium hydroxide solution and extracting with ether. The combined ether extracts are dried over solid potassium hydroxide pellets, and the solvent removed by distillation. The free base is purified by recrystallization from acetone.

Substitution in the above procedure of the cetyl amine by appropriate amounts of other long chain primary amines, such as dodecyl-, tridecyl-, tetradecyl-, petadecyl-, heptadecyl- or octadecyl amines, produces the respective N-alkyl thiamorpholines, the physical and chemical properties of some of which are summarized below.

|  | M. P. 0° C. | M. P. Hydro-chloride |
|---|---|---|
| N-Dodecyl-thiamorpholine | 75 | 159 |
| N-Tetradecyl-thiamorpholine | 82 | 164 |
| N-Hexadecyl-thiamorpholine | 90–91 | 162 |
| N-Octadecyl-thiamorpholine | 131 | 173 |

Example 2.—N-cetyl-thiamorpholine-1-oxide

Fifty-five grams of cetyl amine (B. P. 325° C. (uncor.) and forty grams of di-(β-chloro-ethyl) sulfoxide (M. P. 109°) are dissolved in 500 cc. of 95% alcohol and 24.1 grams of powdered anhydrous sodium carbonate are added. The reaction mixture is refluxed for three hours and the hot solution is filtered to remove inorganic salts, washing twice with hot alcohol. The product crystallizes in quite pure form, which may be further purified by a re-crystallization from alcohol.

The hydrochloride is prepared by dissolving the product in dry benzene and passing in dry hydrogen chloride gas, and purified by re-crystallization from benzene or alcohol, and finally washing with dry acetone.

Substitution in the above procedure of the cetyl amine by appropriate amounts of other long chain substituted primary amines produces the respective N-alkyl-thiamorpholine-1-oxides, the physical and chemical properties of some of which are summarized below.

|  | M. P. 0° C | M. P. Hydrochloride |
|---|---|---|
| N-Dodecyl-thiamorpholine-1-oxide | 83 | 203 |
| N-Tetradecyl-thiamorpholine-1-oxide | 88 | 178 |
| N-Hexadecyl-thiamorpholine-1-oxide | 89 | 176 |
| N-Octadecyl-thiamorpholine-1-oxide | 112 | 148 |

Example 3.—N-cetyl-thiamorpholine-1-dioxide

Fifty and five-tenths grams of cetyl amine (B. P. 325° C. (uncor.) and forty grams of di-(β-chloro-ethyl) sulfone are dissolved in 500 cc. of alcohol, and 22.2 grams of powdered anhydrous sodium carbonate is added. This reaction mixture is refluxed for one hour, the warm solution filtered to remove inorganic salts, and the salts washed twice with hot alcohol. The product crystallizes on cooling and may be further purified by one re-crystallization from alcohol. The hydrochloride is prepared by dissolving the product in dry benzene and passing in dry hydrogen chloride gas. This may be further purified by recrystallization from benzene or alcohol, finally washing with dry acetone.

Again, substitution in the above procedure of the cetyl amine by appropriate amounts of other long chain primary amines produces the respective N-alkyl-thiamorpholine-1-dioxides, the physical and chemical properties of some of which are tabulated below:

|  | M. P. 0° C. | M. P. Hydrochloride |
|---|---|---|
| N-Dodecyl-thiamorpholine-1-dioxide | 73 | 173 |
| N-Tetradecyl-thiamorpholine-1-dioxide | 85 | 169 |
| N-Hexadecyl-thiamorpholine-1-dioxide | 88 | 160 |
| N-Octadecyl-thiamorpholine-1-dioxide | 92 | 151 |

Example 4.—Quaternary ammonium alkyl sulfates

One-tenth mol. of N-alkyl-thiamorpholine, or N-alkyl-thiamorpholine-1-oxide, or N-alkyl-thiamorpholine-1-dioxide is dissolved in an equal volume of dry benzene. To this solution is then added 0.1 mol. of the respective, freshly-distilled di-alkyl sulfate (di-methyl or diethyl sulfate). The reaction mixture is then refluxed in an oil bath at 120° for two hours. The benzene is then removed by vacuum distillation and the residue is taken up in methanol. To this is added a little solid barium carbonate to destroy any unreacted di-alkyl sulfate, and a little decolorizing carbon. The solution is then filtered, and the methanol removed by vacuum distillation. The product is taken up in the least quantity of warm water. The products are usually crystallized from concentrated water solution and are washed with dry acetone after filtering and air drying.

These quaternary ammonium sulfates are soluble in water; the ethosulfates are usually about two times soluble in water as the respective metho-sulfates. The physical properties of some of these capillary active substances are enumerated below.

|  | M. P. ° C. |
|---|---|
| N-cetyl-N-methyl-thiamorpholinium methosulfate | 210 |
| N-cetyl-N-methyl-thiamorpholinium-1-oxide methosulfate | 222 |
| N-cetyl-N-methyl-thiamorpholinium-1-dioxide methosulfate | 185 |
| N-cetyl-N-ethyl-thiamorpholinium ethosulfate | 202 |
| N-cetyl-N-ethyl-thiamorpholinium-1-oxide ethosulfate | 215 |
| N-cetyl-N-ethyl-thiamorpholinium-1-dioxide ethosulfate | 173 |

Example 5.—Quaternary ammonium halides

The methiodides and ethiodides are prepared by refluxing for three hours the respective N-alkyl-thiamorpholines, N-alkyl-thiamorpholine-1-oxides, or N-alkyl-thiamorpholine-1-dioxides with a slight excess of methyl or ethyl iodide, respectively. After refluxing, the excess alky iodide is allowed to evaporate or is removed by distillation under diminished pressure. The residue is usually crystallized from hot ethyl acetate.

Refluxing of the above free bases with molar quantities of benzyl chloride, or an alkyl bromide in toluene solution for six hours, produces the corresponding quaternary ammonium chlorides or bromides, respectively. The solvent is usually removed by distillation in vacuo, the residue is then washed with dry acetone and finally also crystallized from hot ethyl acetate.

Some of the quaternary ammonium halides produced by the above procedure are given below.

|  | M. P. °C. |
|---|---|
| N-cetyl-N-methyl-thiamorpholinium iodide | 224 |
| N-cetyl-N-methyl-thiamorpholinium-1-oxide iodide | 234 |
| N-cetyl-N-methyl-thiamorpholinium-1-dioxide iodide | 190 |
| N-cetyl-N-ethyl-thiamorpholinium iodide | 205 |
| N-cetyl-N-benzyl-thiamorpholinium chloride | 166 |
| N-cetyl-N-n-propyl-thiamorpholinium bromide | 225 |
| N-cetyl-N-benzyl-thiamorpholinium bromide | 198 |

Example 6.—Double quaternary ammonium salts

Two mol. equivalents of N-alkyl-thiamorpholines, N-alkyl-thiamorpholine-1-oxides, or N-alkyl-thiamorpholine-1-dioxides are mixed with one mol. equivalent of an alkylene di-halide (1,2-di-bromo-ethane; 1,3-di-bromo-propane; 1,5-di-bromo-pentane; 1,6-di-bromo-hexane; 1,10-di-bromo-decane; etc.). The mixture is then heated at 100° C. for eight hours. The resulting reaction mass is then crystallized from 50% ethyl alcohol with the application of decolorizing carbon. The compounds are finally crystallized from acetone.

These compounds are formed in accordance with the following reaction equation:

2Z(CH₂CH₂)₂NR+Br(CH₂)ₙBr→
  [Z(CH₂CH₂)N(R)—(CH₂)ₙ—N(R)(CH₂CH₂)₂Z]⁺⁺2Br⁻
  Z: S, SO, SO₂ and some of them are enumerated below:

| | M. P. °C. |
|---|---|
| 4,4'-dihexadecyl-4,4'-ethylene-di-thiamorpholinium di-bromide | 178 |
| 4,4'-dihexadecyl-4,4'-propylene-di-thiamorpholinium di-bromide | 140 |

What we claim is:
1. Compounds of the general formula:

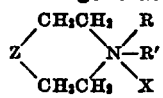

in which Z represents an atomic grouping selected from the class consisting of S, SO, and SO₂, R an alkyl radical containing from 12 to 18 carbon atoms, R' a short chain alkyl radical, X an anion.

2. Compounds of the general formula:

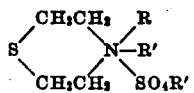

in which R represents an alkyl radical containing from 12 to 18 carbon atoms and R' a short chain alkyl radical.

3. Compounds of the general formula:

in which R represents an alkyl radical containing from 12 to 18 carbon atoms and R' a short chain alkyl radical.

4. Compounds of the general formula:

in which R represents an alkyl radical containing from 12 to 18 carbon atoms and R' a short chain alkyl radical.

JOSEPH B. NIEDERL.
WILLIAM F. HART.

REFERENCES CITED

The following references are of record in the file of this patent:

UNITED STATES PATENTS

| Number | Name | Date |
|---|---|---|
| 2,001,584 | Reed | May 14, 1935 |
| 2,129,805 | Wilson | Sept. 13, 1938 |
| 2,295,504 | Shelton | Sept. 8, 1942 |

FOREIGN PATENTS

| Number | Country | Date |
|---|---|---|
| 133,108 | Great Britain | Sept. 26, 1919 |

OTHER REFERENCES

Journal of the American Chemical Society, vol. 66, pages 840–1.
Chemical Reviews, vol. 15 (1934), pages 452–460.
Journal of the American Chemical Society, vol. 47 (1925), pp. 2821–2831.